Jan. 9, 1923.

E. J. WENDELL.
ROTOR FOR ROTARY PUMPS.
FILED MAY 13, 1921.

1,442,018.

Inventor.—
Evert Jansen Wendell.
by his Attorneys:—
Howson & Howson.

Patented Jan. 9, 1923.

1,442,018

UNITED STATES PATENT OFFICE.

EVERT JANSEN WENDELL, OF WAYNE, PENNSYLVANIA.

ROTOR FOR ROTARY PUMPS.

Application filed May 13, 1921. Serial No. 469,208.

*To all whom it may concern:*

Be it known that I, EVERT JANSEN WENDELL, a citizen of the United States, residing in Wayne, Pennsylvania, have invented certain Improvements in Rotors for Rotary Pumps, of which the following is a specification.

My invention relates to improvements in rotary pumps, and one object of my invention is to provide a rotor which combines to a marked degree simplicity, durability and strength with exceptional efficiency of operation and with ease and comparative cheapness of manufacture.

Figure 1:
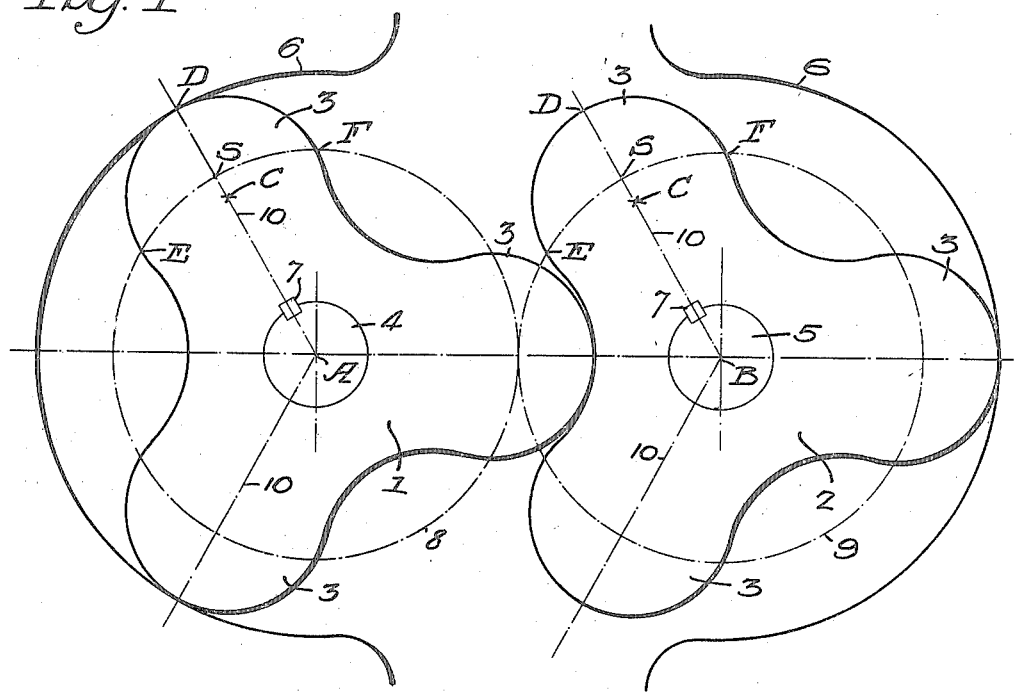
Figure 2:
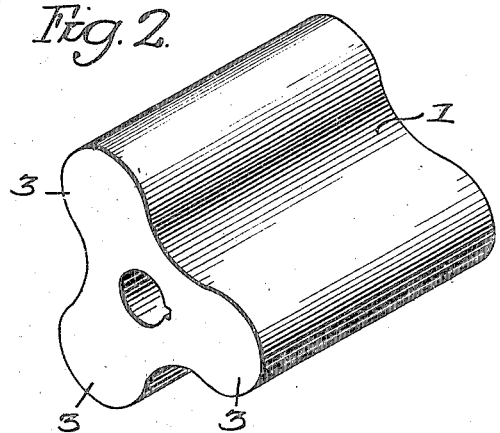

The invention will be more readily understood by reference to the attached drawings, in which:

Figure 1, is a view in diagram of a pair of rotors made in accordance with my invention mounted within a pump casing, and Fig. 2, is a detached perspective of one of the rotors.

With reference to the drawings, the rotor or rotors 1 and 2, which may comprise three or more radial and evenly spaced teeth 3, are mounted upon adjacent and parallel shafts 4 and 5, suitably journaled in the pump casing 6, to which shafts the said rotors are fixed in suitable manner, as by keys or splines 7, 7, established in grooves in the shafts and rotors, or integral with one or the other, and which preferably are operatively interconnected by suitable gears (not shown) of equal pitch ditmeter, also fixed to the respective shafts, whereby when the shafts, or either one thereof, are rotated from a suitable external source of power (also not shown), an exactly equal angular velocity of the rotors is insured.

In laying out the rotors, the distance AB between the centers A and B thereof may be assumed, and from these centers I first lay off the pitch circles 8 and 9. As previously stated, the rotors may comprise three or more teeth spaced apart at angles of $\frac{360°}{M}$, where N represents the number of teeth, and the next step is to draw from the respective centers A and B radii 10 representing the center lines of the various teeth and spaced in accordance with the above formula. From the points S where the said radii meet the pitch circles, I next lay off upon the said radii and inwardly of the pitch circles the distance SC, equal to $\frac{CD}{N+1}$ where CD equals $\frac{AB}{N+1}$ and with C as a center, I lay off the arc EDF with a radius equal to $\frac{AB}{N+1}$, thus forming the face of the rotor tooth. The flank of this tooth is the curve which is conjugate to the face EDF.

I have found that rotors made in accordance with this invention present an absolutely smooth surface to the fluid, there being no abrupt changes in the contour, or sharp projecting fins, and as a consequence the friction between the rotor surfaces and the fluid is reduced to a minimum, as also are eddy currents. I have also found that due to the fact that the V-shaped space between the teeth of the respective rotors at each side of the point of contact diverges from the said point of contact very gradually, the joint at the point of contact is comparatively water-tight, the slippage between the teeth in a pump employing this rotor being extremely low.

It has also been found that as the rotors revolve, the point of contact between the two moves gradually and progressively and continuously in one direction and does not jump from one point to another as is the case with many of the rotors of similar type. A result of this progressive contact is a more constant velocity of the outgoing fluid, which materially affects the efficiency of the pump, another advantage being that substantially no fluid is permitted to be carried between the teeth over to the suction side of the pump.

It will further be noted that the space lying between the teeth of the rotors as they revolve and upon the discharge side of the rotors is maintained continuously in the form of a V diverging outwardly from the point or line of contact between the rotors. As a result, the fluid is forced straight out through an opening which is continuously V-shaped and which at no time is reduced or restricted by the meshing of the rotor teeth. There is with this rotor, as a consequence no throttling, since the opening between the teeth out of which the fluid is being forced is never suddenly reduced, as is so often the case in other rotors when the face of a tooth on one rotor approaches the flank of a tooth on the other. Due largely to this factor, it has been found that a rotor of the type herein described shows a materially higher efficiency than one of the throttling type, and the absence of all throttling effect makes absolutely unnecessary lateral intake and discharge ports which have been found so necessary as to be the subject of patents in connection with pumps having the throttling type of rotor tooth. While the lateral intake and discharge ports relieve somewhat the throttling effect of the rotor teeth, their use causes a very sudden change in the direction of flow of a substantial portion of the fluid pumped, and therefore impairs the efficiency of the pump in addition to complicating the construction.

I have further found that while a pump containing my rotor does not obtain absolutely uniform velocity in discharging the fluid, it approaches much closer to a uniform velocity than has to my knowledge hitherto been obtained in a pump of this kind.

My rotors possess besides the hereinbefore enumerated advantages, extreme simplicity, durability and strength, and are extremely easy to manufacture due to the fact that those portions of the peripheral surfaces of the rotor lying between the center lines of the respective teeth are at no point inclined excessively to normals to the surfaces at the centers of said portions, and accordingly the thrust upon a cutter employed in forming these portions of the rotor surfaces is generally more nearly in a direction at right angles to the axis of rotation of the cutter, which eliminates many of the difficulties experienced in forming teeth of other forms. The rotors possess further the characteristic of extreme efficiency, the gains made in efficiency through the use of this rotor being pronounced when water or other comparatively light fluid is being pumped, but becoming more pronounced in the pumping of heavier fluids, such as molasses or heavy oils.

I claim:

In a rotary pump, a pair of rotors having intermeshing teeth the faces of which are drawn on the arc of a circle whose radius is equal to $\frac{AB}{N+1}$ and whose center lies radially inwardly of the pitch circles of the rotors a distance equal to $\frac{CD}{N+1}$ where AB represents the distance between the centers of said rotors where CD equals $\frac{AB}{N+1}$ and N the number of teeth, and the flanks of which teeth are drawn on curves substantially conjugate to the said face curves.

EVERT JANSEN WENDELL.